March 1, 1938.  L. A. GRAHAM  2,109,695
VARIABLE SPEED TRANSMISSION
Filed Dec. 12, 1936  3 Sheets-Sheet 1
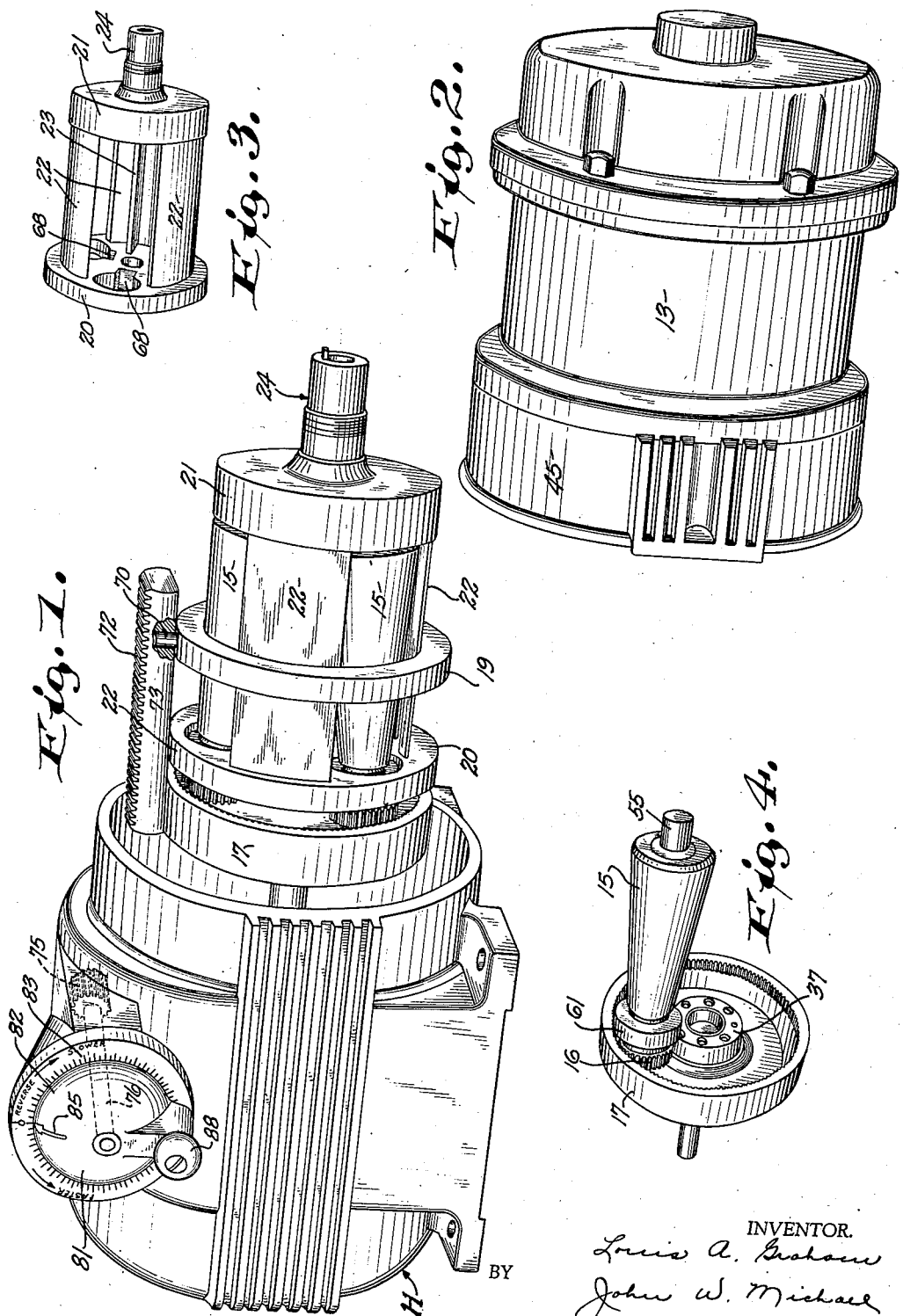
INVENTOR.
Louis A. Graham
BY John W. Michael
ATTORNEY.

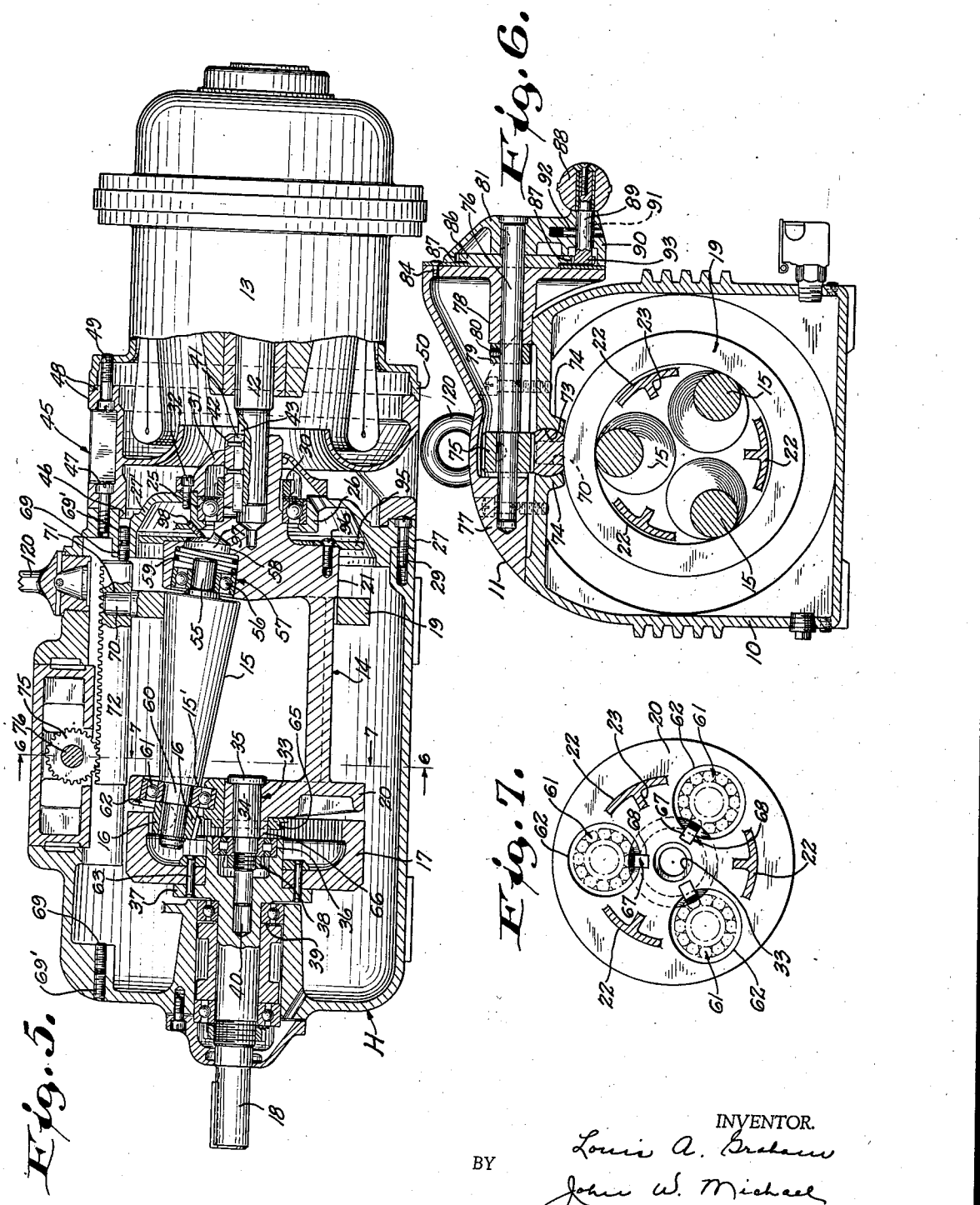

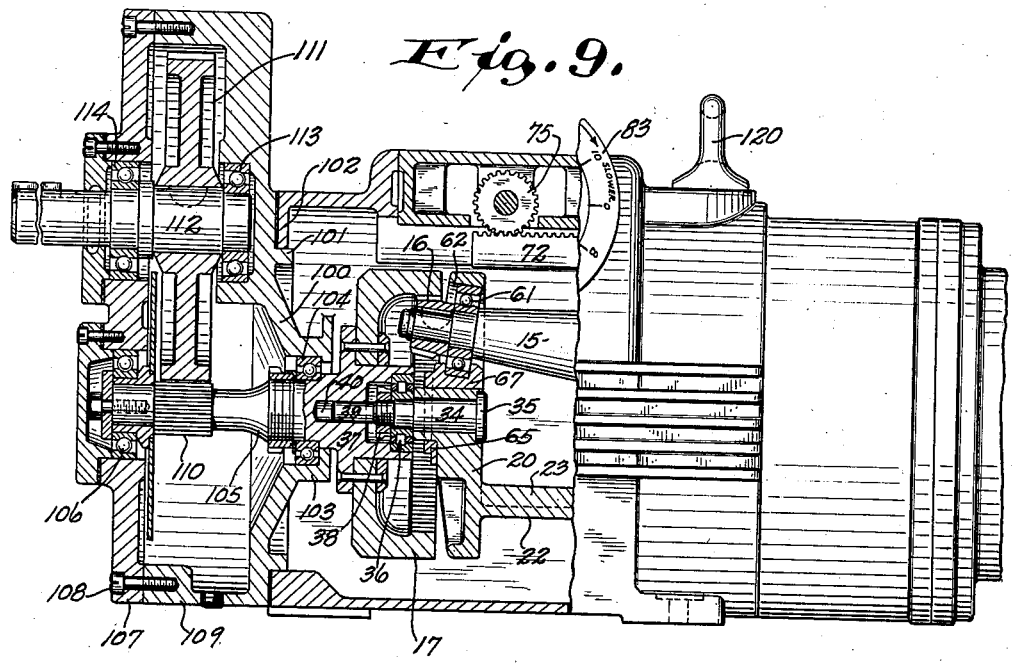

Patented Mar. 1, 1938

2,109,695

UNITED STATES PATENT OFFICE 2,109,695

VARIABLE SPEED TRANSMISSION

Louis A. Graham, Milwaukee, Wis.

Application December 12, 1936, Serial No. 115,486

10 Claims. (Cl. 74—281)

This invention relates to an improvement in variable speed transmissions of the type wherein a plurality of longitudinally tapered planet rollers are controlled in their action by an encircling traction ring adjustable lengthwise of the rollers to vary the speed and direction of the motion transmitted by the device.

Among the objects of the invention are to simplify and compact a transmission of this character, the number of parts making up the transmission being reduced to a minimum; to render available a wide range of speeds and reverse; and to realize these advantages in a unit which is extremely quiet in operation and capable of production at a low cost.

Another object of the invention is to simplify and facilitate the control had over the speed variations, a single turn of the control element providing for variation of the speeds over the entire range, and a minimum amount of power being required to effect the speed shift.

Another object of the invention is to provide a simplified and improved mounting for the longitudinally adjustable traction ring, one which not only facilitates the control over the ring but floatably mounts it so that it will compensate for inaccuracies that find their way into constructions of this character.

Other objects of the invention are to provide a transmission of this character which has simplified and improved means for tying the rollers together; for forcing the rollers outwardly into pressure contact with their encircling ring; and for interconnecting the driving motor with the housing of the transmission so that transmission may be equipped with a factory built-in motor or may be readily combined with a separate motor or other type of drive.

Another object is to provide a transmission of this character which may be readily equipped with a supplementary speed changing device at the output end thereof.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a perspective view illustrating a variable speed transmission embodying the present invention, the internal parts of the transmission being shown as pulled out of the housing and the driving motor, adapter, and removable end cover being omitted;

Figure 2 is a perspective view of the driving motor and its adapter ring;

Figure 3 is a perspective view of the rotary carrier employed in the transmission shown in Figure 1;

Figure 4 is a perspective view of one of the planet members and the driven internal gear;

Figure 5 is a view of the transmission showing the same partly in longitudinal vertical section and partly in side elevation, the transmission being shown as equipped with a built-in motor;

Figure 6 is a view in transverse section taken on line 6—6 of Figure 5 and looking in the direction of the arrows;

Figure 7 is a fragmentary view in section taken in the plane of line 7—7 of Figure 5 and looking in the direction of the arrows;

Figure 8 is a detail perspective view illustrating the structure employed for tying the rollers together;

Figure 9 is a fragmentary view partly in side elevation and partly in longitudinal vertical section showing the transmission equipped with a speed reducer or reducing gear set at its output end; and Figure 10 is a view in end elevation of the transmission shown in Figure 9.

Referring to the drawings, it will be seen that the transmission is enclosed in a housing designated generally at H and made up of a lower section 10 and a removable top or cover section 11.

The transmission comprises generally a drive shaft 12 driven by an electric motor 13 and keyed or fixed to a rotary carrier 14 supported for rotation in the housing. Mounted on the carrier for rotation therewith and with respect thereto are a plurality of, preferably three, planet rollers 15. Planet pinions 16 which are fixed to and rotate with the rollers mesh with an internal ring gear 17 secured to the driven shaft 18. Encircling the planet rollers 15 is a traction ring 19 which is adjustable lengthwise of the rollers to vary the speed and direction of motion transmitted by the device.

As in all transmissions of this type, the axes of the rollers 15 are uniformly inclined with respect to the axis of rotation of their carrier 14 and each roller 15 is longitudinally tapered at an angle equal to the angle of inclination of its axis, the arrangement being such that the outermost elements of the tapered peripheral surfaces of the several rollers are always parallel to the axis of rotation of the carrier.

The rotary carrier 14 is preferably a single piece casting having circular end plates 20 and 21 connected by longitudinally extending and angularly spaced webs 22 integral with the end plates and provided with integral reinforcing ribs 23. By constructing the rotary carrier as a one-piece casting, the cost of manufacture is greatly reduced, the necessity of difficult machining operations is avoided and precision in alinement and other desirable structural characteristics are had.

One way in which the carrier 14 is supported for rotation will be specifically described. The end plate 21 has formed integral therewith a supporting sleeve 24 which projects axially beyond the end plate 21. In the assembly this sleeve 24 is supported on a ball bearing assembly 25, the latter being supported in turn on a flanged seat 26 provided therefor on a removable cover member 27. The cover member 27 closes one end of the housing H and is held in place by bolts or screws 29. A nut 30 secures the inner race member of the ball bearing assembly 25 in proper position on the supporting sleeve 24 whereas a cap 31 held in position by screws 32 maintains the outer race member of the ball bearing assembly 25 in engagement with its flanged seat 26.

The other end plate 20 of the rotary carrier has a central opening 33 receiving a stub shaft 34. The inner end of the stub shaft 34 is provided with a head 35 which abuts the inner face of the end plate 20 of the carrier. The outer end of the stub shaft projects beyond the end plate 20 of the carrier and extends into a bearing 36 which is supported in a bearing seat provided therefor on the headed end 37 of the driven shaft. A nut 38 threadedly engaged with the stub shaft and engaging the bearing assembly 36 maintains these parts in position. Beyond the nut 38 the stub shaft has an extension 39 which is fitted in an axial bore 40 provided therefor in the driven shaft.

The present invention proposes that the drive be transmitted to the carrier by fixing the carrier to the shaft 12 of the electric motor 13 and in the construction illustrated this is accomplished by means of a key 41 fitted in an internal key-way in the sleeve 24 and held in such key-way by rivets 42 and also fitted in a key-way 43 formed in the outer end of the drive shaft 12.

In between the casing of the electric motor 13 and the cover 27, an adapter 45 is provided. This adapter is of general band or ring-like form and has a flanged formation 46 interfitted with the periphery of the cover and releasably secured thereto by means of screws or bolts 47. At its opposite end it has a similar flanged formation 48 detachably fastened by screws or bolts 49 to the flanged end 50 of the electric motor casing. With the built-in design the adapter provides a rigid, strong, flanged connection between the footless electric motor and the housing of the transmission. Where it is desired to use a coupled type of motor which is usually securely fastened to a bed plate the adapter 45 is omitted, but the cover 27 remains in place so that the transmission is standard for either type of motor.

The present invention proposes that the planet rollers 15 be supported on the rotary carrier 14 not only for rotation therewith and with respect thereto but also for sliding movement outwardly along their inclined axes and hence into pressure contact with the traction ring 19. One way in which this mounting of the planet roller may be accomplished with convenience and advantage will now be described.

Each planet roller 15 is provided at its large end with a trunnion 55 rotatably supported in a ball bearing assembly 56 slidably mounted in an opening 57 provided therefor in the end plate 21 of the carrier. Each opening 57 is provided at one end with an inwardly projecting annular shoulder 58. Between each shoulder 58 and the outer race member of the ball bearing assembly therein is a coil spring 59 which is under compression and acts to force the bearing which it engages upwardly and outwardly along the opening 57 and consequently to force its associated planet roller 15 outwardly, thereby developing the desired working pressure between each roller and the encircling traction ring 19.

At the opposite end of each roller 15 a trunnion 60 is provided which is supported in a ball bearing assembly 61 slidably mounted in an opening 62 provided therefor on the end plate 20. Beyond the trunnions 60 the planet pinions 16 are secured to integral extensions of the rollers 15 and mesh with the internal ring gear 17 as hereinbefore indicated. The inner raceway of each bearing 61 is securely held in position on its trunnion 60 by virtue of its confinement between the adjacent pinion 16 and a shoulder 15' presented by the small end of the roller at its juncture with trunnion 60. The arrangement is such that each roller 15 and its bearings 56 and 61 slide as a unit relative to the openings 57 and 62 in the end plates 21 and 20 of the rotary carrier. But slight sliding movement is necessary to develop proper working pressure between the rollers 15 and the traction ring 19. There is sufficient backlash in the pinions 16 and ring gear 17 to allow the requisite sliding movement of the planet roller assemblies. As illustrated in Figure 1, the internal ring gear 17 is fastened as at 63 to the headed end of the driven shaft 18.

For the purpose of tying the rollers together and constraining them to partake of corresponding outward movement under the influence of their respective springs 59, suitable means is provided and may comprise a collar 65 slidably mounted on a short annular extension 66 formed integral with the end plate 20 around its central opening and projecting from its outer face. Notched fingers 67 are integrally formed with the collar 65 and project longitudinally and inwardly therefrom. These fingers are slidable in key-ways 68 provided therefor in the end plate 20. These key-ways 68 intersect the openings 62 and the end walls 67' of the notches in the fingers 67 overlap the side faces of the outer race-way of bearings 61 as clearly shown in Figures 5 and 7 so that the rollers are tied together insofar as outward movement is concerned and irrespective of individual roller tendencies all must move outwardly as a unit.

The traction ring 19 is constructed of suitable steel or other suitable material so as to be non-resilient, that is, of such character that it does not partake of elastic deformation when coacting with the rollers 15 during the operation of the device. Means is provided for mounting and actuating the traction ring 19 whereby it is capable of translatory movement lengthwise of the rollers to control their motion and is also floatable to compensate for inaccuracies, that is, capable of translatory movement in a plane at right angles to the axis of rotation of the carrier and of oscillating or swinging movement transverse to said axis. One means for accomplishing this mounting and actuation of the traction ring 19 will now be described.

Fixed to and projecting outwardly from the ring 19 is a pin 70. This pin is of circular cross section and has a free working fit in an opening 71, provided therefor in a rack 72. The pin 70 may not only rotate in its opening 71 but may slide vertically, that is, along the axis thereof. By locating the opening 71 adjacent one end of the rack 72 the space requirements of the structure are kept to a minimum. The rack 72 has its side faces rounded as shown at 73 in Figure 6 and these side faces have a working fit in the correspondingly curved members 74 of a guideway provided for the rack on the housing H. This mounting of the rack allows the ring 19 to oscillate or swing transversely to the axis of the carrier. The ring is also capable of translatory movement in a plane at right angles to the axis of rotation of the carrier due to the sliding fit of its pin 70 in the opening 72 of the rack and for translatory movement parallel to the axis thereof, and lengthwise of the rollers due to the mounting of the rack for longitudinal sliding movement in the guide-ways 74.

For the purpose of moving the ring longitudinally of the rollers and consequently in a direction parallel to the axis of the carrier, a pinion 75 meshes with the rack 72. The mesh of the teeth of the pinion 75 with the teeth of the rack 72 is of such character as not to interfere with the requisite freedom of the ring to oscillate or swing transversely. This pinion is fixed to a control shaft 76 journaled in bearings 77 and 78 provided therefor on the cover section 11 of the housing. A collar 79 secured by a screw 80 to the control shaft and engaging the inner end of the bearing 78 maintains the shaft against axial movement.

Suitable means is provided for turning the shaft 76 and holding it in adjusted position. One such means includes a control disc 81 fixed to the outer end of the control shaft 76. This disc is circular in outline and is domed or bowed transversely and has its peripheral flange-like portion 82 disposed to travel around a fixed control dial 83. The control dial 83 is fastened as by screws 84 to the adjacent portion of the upper section 11 of the housing and bears on its exposed surface suitable graduations and indicia with which an arrow or pointer 85 on the outer face of the control disc coacts. Within the confines of the control disc, a fixed locking plate 86 of annular form is fastened to the casing section 11 and has its periphery provided with teeth 87. A knob 88 is fixed to the outer end of a short shaft 89 which is supported for sliding movement in a bearing 90 provided therefor on the control disc 81. A key 91 carried by the disc 81 and coacting with the key-way in the shaft 89 constrains the shaft to sliding movement. A spring-actuated detent 92 is cooperable with the shaft to releasably hold it in its locked position. The inner end of the shaft 89 is provided with teeth 93 designed to interlock with the teeth of the locking disc 86 thereby maintaining the parts in the adjustment selected. A single turn of the knob is sufficient to carry the device throughout its entire range of speeds. Furthermore, the knob turns freely as but a minimum amount of power is required to effect the speed shift.

The longitudinal movement of the rack 72 in either direction is limited in any suitable way, as by stop screws 69 threadedly engaged with the housing and engageable with the ends of the rack 72. Lock screws 69' secure the stop screws 69 in any adjustment.

While the transmission may be lubricated in various ways, the construction illustrated is shown as splash lubricated and in such event special provisions are made for lubricating the bearings located nearest the axis of rotation of the carrier. For this purpose the end plate 21 is provided with an annular plate 95 fastened thereto by screws 96 and adjacent each roller bearing assembly with an oil passageway 97. Furthermore, the flanged seat 26 is provided with a plurality of oil-ways or chutes 98 located just above the juncture of the sleeve 24 with its end plate 21.

With this construction the oil is thrown outwardly by the plate 95 but is deflected back by the sloping wall 27' of the cover so as to flow into the openings 97 of the end plate 21, thence outwardly past the annular shoulder 58, under the influence of centrifugal force, to the bearing assembly 56. The annular shoulders 58 insure the passage of the oil to the bearing assemblies 56. Some of the oil also travels back to the bearing 25. With this construction churning and excessive heating of the oil is avoided and effective lubrication is had without resort to the use of pumps.

The transmission disclosed in Figures 1 to 8, inclusive and just described, may be conveniently converted to the so-called geared head type, that is, to an arrangement where reduction or step-up ratios are incorporated in the unit at the output end thereof.

For example, this may be accomplished in the manner shown in Figures 9 and 10 where the construction at the out-put end of the unit is varied. As illustrated, instead of having the end wall of the housing at the out-put end of the unit integral with the main body of the housing it may be constituted of a separate member designated at 100 and having a flange 101 interfitted with an inturned flange 102 on the housing. The member 100 is suitably bolted in position. At its center the member 100 is provided with a bearing support 103 containing one of the bearings 104 which rotatably supports the driven shaft 105. The shaft 105 is supported at its outer end by means of a bearing 106 carried by an end plate 107 bolted as at 108 to the flange 109 of the member 100. Intermediate its ends the shaft 105 has a pinion 110 fixed thereto and meshing with a large gear wheel 111 keyed to a shaft 112 supported in bearings 113 and 114 and projecting beyond the bearing 114 so as to be adapted for coupling to the instrumentalities to be driven.

To facilitate handling of the transmission, its housing may be provided with a suitable eye 120 adapted for engagement with the hook of a hoist.

In all embodiments of the invention, the rollers 15 are relatively large and heavy so that they are moved outwardly along their inclined axes under the influence of centrifugal force as well as under the influence of their respective springs.

A variable speed transmission constructed as above described may be conveniently manufactured at a low cost. The device is capable of wide variety of applications. It is readily controlled, quiet and efficient in operation and renders available a wide range of speeds and reverse. And yet, the structure is extremely simple and highly compact. It may be applied with equal effectiveness to a built-in motor, coupled motor or other type of drive and can be readily combined with reduction or step-up ratios, which may be conveniently incorporated at the out-put end of the unit.

While I have shown and described several constructions in which the invention may be ad-

The invention claimed is:

1. A variable speed transmission of the character described comprising a rotary carrier, a plurality of conical planetary rollers supported for rotation with and with respect to the carrier and inclined with respect to the axis of rotation thereof, a non-rotatable, non-resilient ring encircling the rollers and having a projection, an actuating member having an opening in which said projection is fitted for movement in a plane transverse to the axis of rotation of the carrier, a guide supporting said actuating member for oscillating movement about an axis external to the ring and parallel to the axis of rotation of the carrier and for sliding movement longitudinally of said rollers, and means for moving said actuating member longitudinally.

2. A variable speed transmission of the character described comprising a rotary carrier, a plurality of conical planetary rollers supported for rotation with and with respect to the carrier and inclined with respect to the axis of rotation thereof, a non-rotatable, non-resilient ring encircling the rollers and having a projection, a rack having an opening receiving said projection, means for supporting said rack for movement longitudinally of the rollers and for oscillation, and means for moving the rack longitudinally.

3. A variable speed transmission of the character described comprising a rotary carrier, a plurality of conical planetary rollers supported for rotation with and with respect to the carrier and inclined with respect to the axis of rotation thereof, a non-rotatable, non-resilient ring encircling the rollers and having a projection, a rack having an opening in which said projection is slidably fitted, said rack having curved faces, a guide-way for the rack also having curved faces whereby the rack may oscillate as well as move longitudinally of the guide-way, and means for moving the rack longitudinally.

4. A variable speed transmission comprising a rotary carrier having spaced end plates and a connecting structure therebetween, a plurality of conical planetary rollers inclined with respect to the axis of rotation of the carrier, bearings between the rollers and the end plates of the carrier for supporting the rollers for rotation with and with respect to the carrier and for bodily movement along their axes, a ring encircling the rollers, and a spring device between one of the bearings for each roller and the adjacent end plate of the carrier for causing said rollers to move outwardly and into pressure contact with the ring.

5. A variable speed transmission comprising a rotary carrier, a plurality of conical planetary rollers inclined with respect to the rotation of the carrier, bearings supporting the rollers on the carrier for rotation therewith and with respect thereto and for bodily movement along their axes, a ring encircling the rollers, said carrier having a plurality of shoulders, one adjacent one bearing of each roller, and a helical spring interposed between each of said shoulders and the bearing adjacent thereto, and effective to cause its roller to move toward and into engagement with said ring.

6. A variable speed transmission comprising a carrier supported for rotation about its central axis and having spaced end plates and a connecting structure therebetween, conical planetary roller means inclined with respect to the axis of rotation of the carrier, bearings between the roller means and the end plates of the carrier for supporting the roller means for rotation with and with respect to the carrier and for bodily movement, means encircling said roller means and movable longitudinally over substantially the length thereof, and elastic biasing means interposed between one of the end plates of the carrier and one of the bearings and tending to move said roller means toward said encircling means to develop pressure contact therebetween.

7. A variable speed transmission comprising a rotary carrier having spaced end plates and a connecting structure therebetween, a conical planetary roller inclined with respect to the axis of rotation of the carrier, bearings between the rollers and the end plates of the carrier for supporting the roller for rotation with and with respect to the carrier and for bodily movement, a ring encircling the roller and movable longitudinally over substantially the length thereof, an elastic biasing means acting between one of the bearings of the roller and the adjacent end plate of the carrier and tending to move the roller toward the ring to develop pressure contact therebetween.

8. A variable speed transmission of the character described comprising a rotary carrier having spaced end plates and a connecting structure therebetween, a plurality of conical planetary rollers inclined with respect to the axis of rotation of the carrier, said end plates having alined openings, bearings slidably mounted in said openings and engaged with the rollers for supporting the rollers for rotation with and with respect to the carrier and for bodily movement along their inclined axes, one of the end plates being provided with internal shoulders around its openings near one face of the end plate, a spring device between each of said shoulders and the adjacent bearing for forcing the rollers outwardly along their axes, and a ring encircling the rollers and movable therealong to control their motion.

9. A variable speed transmission of the character described comprising a rotary carrier having spaced end plates and a connecting structure therebetween, a plurality of conical planetary rollers inclined with respect to the axis of rotation of the carrier, said end plates having alined openings, bearings slidably mounted in said openings and engaged with the rollers for supporting the rollers for rotation with and with respect to the carrier and for bodily movement along their inclined axes, one of the end plates of the carrier having an extension and having key-ways extending from the extension and intersecting said openings, a collar slidably mounted on the extension and having notched fingers fixed thereto and slidably fitted in the key-ways, the notches of the fingers embracing portions of the bearings to constrain the rollers to corresponding movement along their axes, a ring encircling the rollers, and means for moving the ring lengthwise of the rollers.

10. A variable speed transmission of the character described comprising a rotary carrier having spaced end plates and a connecting structure therebetween, a plurality of conical planetary rollers inclined with respect to the axis of rotation of the carrier, said end plates having alined openings, roller bearing assemblies slidably mounted in said openings and coacting with the rollers to support them for rotation with and with respect to the carrier, one of said end plates having key-ways intersecting said openings, notched keys slidably fitted in said key-ways and having their notches embracing the outer race-members of the adjacent roller bearing assemblies, means constraining said keys to corresponding movement, and a ring encircling said rollers and movable longitudinally thereof to control their motion.

LOUIS A. GRAHAM.